INVENTOR
EMILE VALLIN
BY
Bailey, Stephens + Huettig
ATTORNEY

3,386,423
FUEL INJECTION SYSTEMS OF THE ACCUMULATION TYPE FOR FREE PISTON AUTOGENERATORS
Emile Vallin, Lyon, France, assignor to Societe d'Etudes et de Participations, Eau, Gaz, Electricite, Energie, S.A. (S.E.P.)
Filed Dec. 12, 1966, Ser. No. 601,032
Claims priority, application France, Dec. 14, 1965, 42,249
9 Claims. (Cl. 123—46)

ABSTRACT OF THE DISCLOSURE

Fuel injecting system of the accumulation type for free piston autogenerators in which an injection piston-pump, operative by the pistons of the autogenerator, delivers fuel to an accumulator chamber from where it is then delivered under pressure to the autogenerator at the end of the delivery stroke of said pump. The accumulator chamber coacts with a piston-cylinder system whose piston is subjected to a pneumatic pressure dependent upon the load on the autogenerator to control the pressure in said chamber, thus the pressure and, consequently, the flow of the fuel injected in the autogenerator, whereby the amount of fuel injected during the practically constant ignition delay separating the beginning of the injection and the auto-ignition of the fuel is less when the autogenerator works under a small load than when it operates under a heavy load.

---

The invention relates to fuel injection systems of the accumulation type particularly suitable for the operation of free piston autogenerators, said system comprising an injection pump and an accumulator under pressure and being further characterized by the fact that the injection pump, instead of delivering fuel directly to the injector pump (or injectors) of the autogenerator which is to be fed by said system, delivers an amount of fuel varying dependent upon the load on the autogenerator to said accumulator under pressure from where said fuel is then supplied to said injector (or injectors) at the required time. The pressure within said accumulator will be referred to hereafter as "injection pressure."

It is known that a certain delay exists between the beginning of the injection in the motor cylinder of a free piston autogenerator and the auto-ignition of the fuel injected, said delay being practically independent from the amount of fuel injected. As a result, with the known accumulation fuel injection devices which provide a practically constant injection pressure, the ratio existing between the amount of fuel injected within the ignition delay and the totality of the fuel injected is greater, in the case where the autogenerator operates under a small load (the total fuel amounts injected on each working stroke then being small), than in the case where the engine operates under a heavy load, whereby the engine is subject to knocking when operating under small loads.

The object of the invention is to obviate such drawbacks.

To that effect and according to the invention, the pressure within the accumulator of the injection pump, hence the injection pressure of the fuel, is caused to vary dependent upon the load on the autogenerator. The decrease of the injection pressure responsive to a decrease of the load on the autogenerator results in a decrease of the injection speed, hence of the amount of fuel injected within the ignition delay.

Further the hole or nozzle of the injector is generally closed, between the ignition periods, by a needle which is lifted under the action of the pressure of the fuel to be injected at the time of injection. If the loading of the needle is constant, it may happen that, under small loads on the autogenerator, the correspondingly low injection pressure will not be sufficient to cause a neat and regular raise of the needle. Accordingly and in relation with a preferred embodiment of the invention, the loading of the injector needle is also caused to vary dependent upon the load of the engine.

In the free piston engines this can be achieved easily by subjecting the loading pressure for the injector needle to the variations of the maximum pressure within the motor portion of this engine, said pressure often increasing together with the load on the engine and vice versa.

For the sake of illustration of the invention, a preferred but non limitative embodiment of the invention will be described hereafter with reference to the drawings in which:

FIG. 1 diagrammatically represents, partially in section and partially in side-view, an accumulation fuel injection pump and a fuel injector supplied by said pump, said accumulation fuel injection pump being provided, according to the invention, with means for varying the fuel injection pressure and the loading of the injector needle depending upon the load on the engine.

Figure 2:
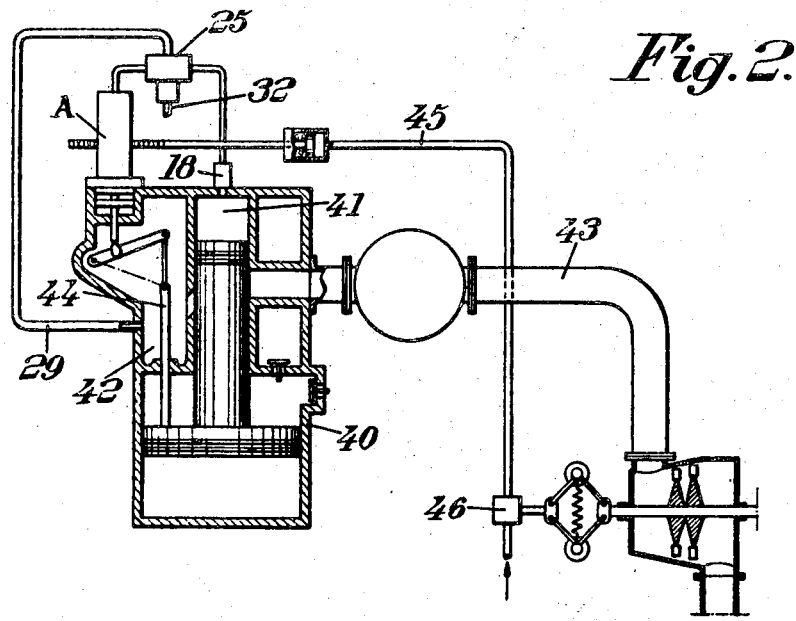
FIG. 2 is a diagrammatical illustration of an installation comprising the means according to the invention.

The invention is suitably applied to an installation, as diagrammatically represented in FIG. 2, which comprises a free piston autogenerator 40 whose motor cylinder 41 fed with air from a casing 42 and with fuel through an injector 18 is working according to a Diesel cycle, that is to say with auto-ignition of said fuel, and a receiver engine such as a turbine driven by the gases under pressure delivered thereto from the autogenerator through conduit means 43.

Concerning the accumulation injection pump A and the injector themselves, irrespective of said means for varying the injection pressure dependent upon the load, they may be contrived in any conventional manner.

Figure 1:
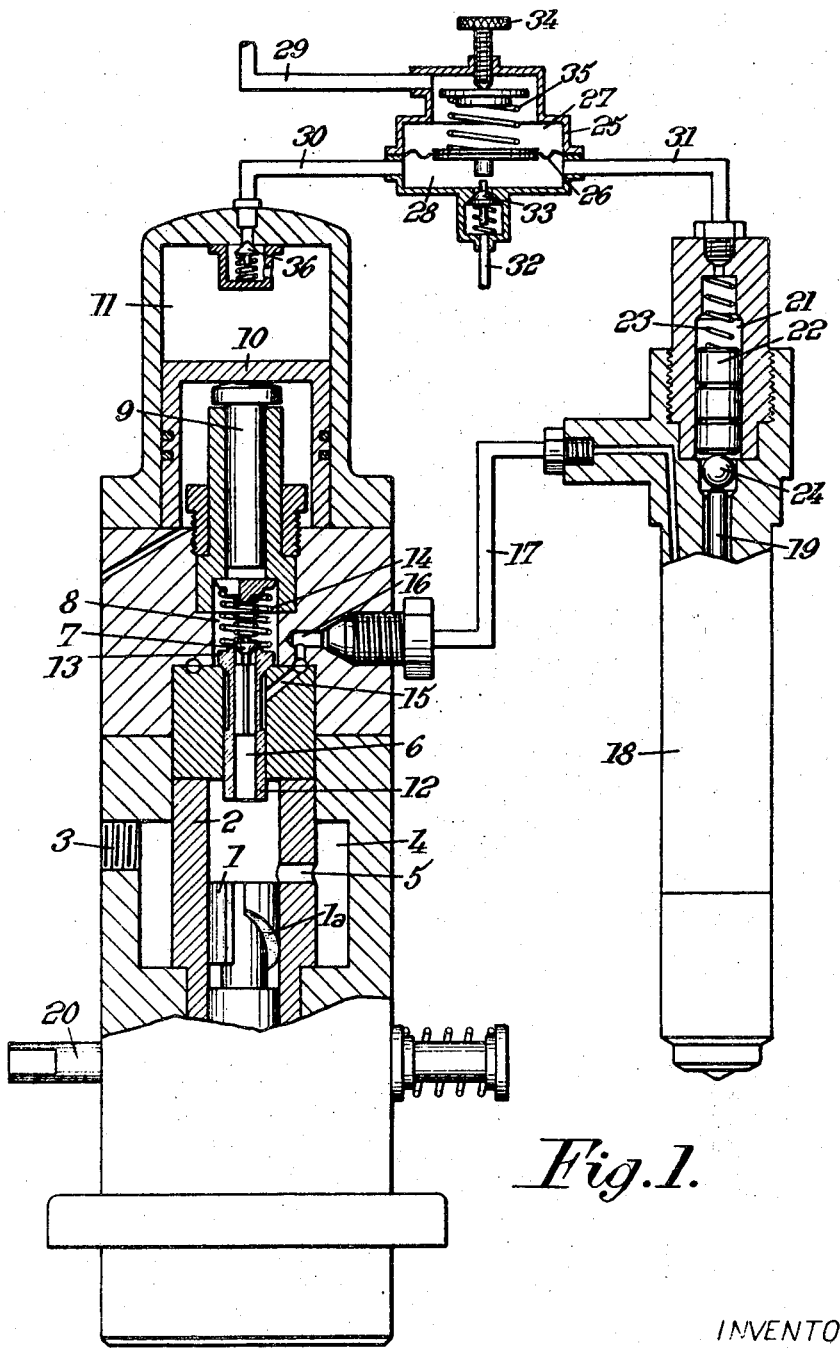

For instance and as shown in FIG. 1, the fuel pump comprises a piston 1 the alternative reciprocations of which within a cylinder 2 are synchronised with the motor piston through any mechanical known linkage, for instance by a lever-linkage system 44 of the type diagrammatically represented in FIG. 2.

The fuel enters within an annular chamber 4 through an opening 3 and is sucked through a port 5 within cylinder 2 during the suction stroke of piston 1 and is driven out from said cylinder through a channel 6 and a valve 7 within an accumulator chamber under pressure 8 during the delivery stroke of said piston.

A piston 9 urged toward the interior of the accumulator chamber 8 by a coaxial piston 10, thereby enabling the variation of the volume of said accumulator chamber, is itself subjected to the action of a loading force which produces a certain pressure within accumulator 8.

At the end of the delivery stroke, the piston 1 of the injection pump abuts against the stem 12 of a valve 13 which is lifted against the action of a counter-acting spring 14, thereby establishing a communication, through conduits 15 and 16 and a duct 17, between the accumulator chamber 8 and the injector 18 in which the fuel admitted under pressure raises the needle 9 normally applied against its seat, not represented, by a loading force.

The amount of fuel delivered by piston 1 into the accumulator 8 on each delivery stroke and fed to the injector at the end of this stroke is controlled in a known manner for instance through a toothed rack 20 which rotates piston 1 about its axis and an annular cam-like shoulder 1a carried by said piston for adjusting the fuel supply of the interior space of cylinder 2 through port 5. Thus, the cam-like shoulder 1a controls the length of the effective delivery stroke of piston 1 responsive to the angular position of the same.

The displacements of the toothed rack 20 may be controlled in a known manner by a fluid pressure modulated by conventional means 46 in function of the load of the turbine and supplied through a conduit 45.

It will be understood that the above described device will permit fuel to be injected in the motor cylinder under a pressure dependent upon the loading force acting on piston 9 through piston 10.

To avoid the knocking of the engine when operated under a small load, the pressure in the accumulator of the injection pump and consequently the injection pressure of the fuel are, according to the invention, varied dependent upon the load on the engine.

Further, in order to avoid, when the autogenerator is working under a small load, that the loading pressure of needle 19 may prevent the opening of the injection nozzle of the injector 18 under the too small pressure of the fuel injected, means are preferably provided according to the invention to also vary the loading pressure of said needle responsive to the load on the autogenerator, in particular for the small loads said autogenerator may be subjected to.

According to a preferred embodiment, the piston 9 of accumulator 8 as well as the needle 19 of injector 18 are subjected to a pneumatic or hydraulic loading pressure varying with the load on the autogenerator supplied with fuel by the injection pump in order to modify, responsive to the importance of said pneumatic or hydraulic pressure, both the pressure of the fuel admitted into injector 18 and the force which opposes the raise of the needle under the action of the fuel to be injected.

The pneumatic pressure may consist of the maximum pressure in the casing 42 of the free piston outogenerator of FIG. 2, which is substantially dependent on the load on said autogenerator.

Advantageously, the loading pressure varying with the load on the engine consists of a pneumatic pressure which acts, on the one hand, on piston 10 in cylinder 11, hence on piston 9, and, on the other hand, on a piston 22 working in a cylinder 21 of injector 18 and coaxial to injection needle 19, the loading pressure on said needle being further reinforced by a spring 23 which urges injector needle 19 on its seat (not represented) in order to close the injector nozzle.

A centering ball 24 may be provided between piston 22 and needle 19.

When the loading pressure consists of a pneumatic pressure, the same may be caused to act directly in cylinders 11 and 21.

However, it is preferable to subordinate the control of the injection pressure to the regulating action of compressed air fed in cylinders 11 and 21 under a flow which itself is controlled by the pneumatic pressure varying with the load dependent upon the load on the engine, said flow also increasing or decreasing in accordance with the leakage flows which are practically unavoidable between piston 10 and cylinder 11.

To that effect, there is provided a pressure regulating device 25 divided into two compartments 27 and 28 by an elastic diaphragm 26, one of said compartments 27 being supplied, through a duct 29, with the fluid creating said pneumatic pressure variable with the load of the engine, whereas the other compartment 28, which is connected to cylinders 11 and 21 through ducts 30 and 31 is also connected to a source of compressed air through a line 32.

The supply of compressed air to compartment 28 is controlled by a check valve 33 which may be opened by diaphragm 26 when the same is depressed in the direction of compartment 28.

The pressure in the accumulation chamber 8 and the loading pressure of the needle 19 may be varied in function of the load on the free piston autogenerator directly responsive to other intermediate factors, such as the pressure of the gases produced by said autogenerator, or also the above modulated pressure which controls the position of the toothed rack 20.

This device operates as follows:

When the load on the autogenerator increases, the pressure in compartment 27 is also caused to increase, thereby pushing diaphragm 26 toward compartment 28 and opening check valve 33. The compressed air flowing through line 32 causes an increase of the pressure in compartment 28 and in cylinders 11 and 21, thereby increasing the injection pressure.

On the contrary, when the load on the autogenerator decreases, the pressure in compartment 27 does the same so that diaphragm 26 is removed from check valve 33 which cuts off the supply of compressed air to compartment 28. Leakages between piston 10 and cylinder 11 (leakages may also be especially provided to that effect) in compartment 28 will then prevail and cause a reduction of the pressure in the latter compartment and, as a consequence, of the injection pressure.

Control means may advantageously be provided for modifying the regulating conditions of the injection pressure variations in function of the load on the autogenerator.

Such regulation means may be constituted by a screw 34 which exerts a more or less important pressure on diaphragm 26 through a spring 35, said pressure then being cumulative to the pneumatic pressure in compartment 27.

There is also advantageously provided a non-return valve 36 between compartment 28 and cylinder 11, in order to prevent overcompressed air to flow from cylinder 11 back into compartment 28 and line 32 on each injection step.

Figure 3:
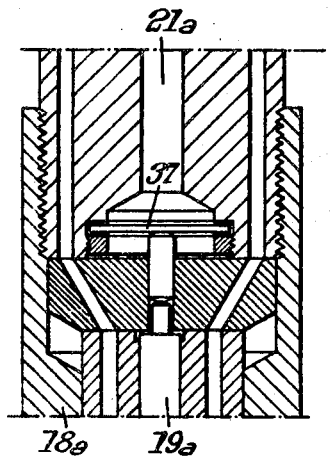
FIGS. 3 and 4 show partial axial sections of alternative embodiments according to the invention, of the injector.

According to the alternative embodiment represented in FIG. 3, piston 22 is replaced by a flat diaphragm 37 transverse with respect to the injection needle 19a, said flat diaphragm 37 tightly closing the space 21a of injector 18a in which is created the loading pressure varying with the load on the autogenerator. This diaphragm constitutes an elastic deformable partition applied on the free extremity of needle 19a. It may be constituted either by a rubber or plastic cushion or by an elastic band.

Figure 4:
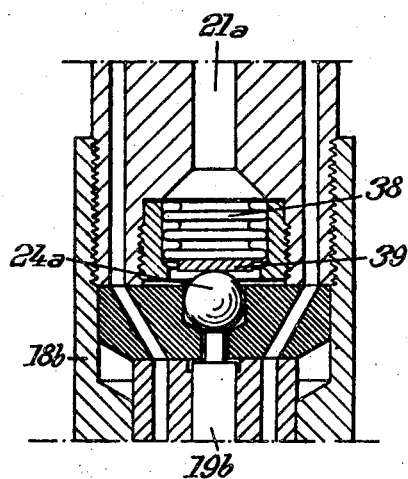

According to another alternative embodiment represented in FIG. 4, a corrugated or folded diaphragm is used in lieu of the flat diaphragm 37, such diaphragm then consisting for instance of a bellows 38 whose bottom is applied against the top of needle 19a, for instance through a centering ball 24a.

It will be appreciated that, whatever be the embodiment contemplated, the invention affords many advantages, among which:

The possibility of controlling the fuel injection speed within very large ranges and of achieving smoother combustions free from knocking when the autogenerator works under a small load;

The possibility of obtaining for the autogenerator injectors a loading pressure varying with the maximum pressure within the motor cylinder, thereby increasing the security against the flowing of gases back into the body of the injector, The possibility, when engine is provided with several injectors, to operate the same under perfectly balanced conditions due to the fact that the loading pressures of all the injectors will be same.

While the invention has been described with particularly preferred embodiments, it will be understood that the invention is not limited to these embodiments but is intended to encompass all alternatives, modifications and equivalents, as may be properly included within the spirit and scope of the invention as defined by the appended claims.

What is claimed is:

1. An installation comprising a free piston autogenerator, an accumulation chamber for fluid under pressure, an injection pump operative by the free pistons of said autogenerator for feeding fuel to said chamber, fuel injector means for said autogenerator, communication means between said accumulation chamber and said fuel injector means, valve means operative by said injection pump, at the end of its fuel supplying process to said accumulation chamber, to open said communication means, and means for controlling the pressure in said accumulation chamber dependent upon the load on said autogenerator.

2. An installation according to claim 1 wherein said injector means comprise an opening for the delivery of fuel to the autogenerator and a needle subjected to a loading pressure closing said opening and adapted to be lifted against the action of said loading pressure by the fuel pressure during the fuel injection process to said autogenerator, said means for controlling the pressure in said accumulation chamber also controlling said loading pressure dependent upon the load on said autogenerator.

3. An installation according to claim 1 wherein said means for controlling the pressure in said accumulation chamber are operative by the pressure of the air fed to the motor cylinder of said autogenerator.

4. An installation according to claim 1 wherein said means for controlling the pressure in said accumulation chamber are operative by the pressure of the air delivered by said autogenerator.

5. An installation according to claim 1 wherein said accumulation chamber coacts with a cylinder-piston system, the motions of said piston causing variations in the volume of said accumulation chamber and wherein said means for controlling the pressure in said accumulation chamber dependent upon the load on said autogenerator are pneumatic means subjecting said piston to the action of air under a variable pressure.

6. An installation according to claim 2 wherein said injector means further comprises a cylindrical bore and a piston movable therein and one face of which acts on said needle and wherein said means for controlling said pressure in said accumulation chamber and also the loading pressure of said needle are pneumatic means subjecting said piston on its other face to the action of air under a variable pressure.

7. An installation according to claim 2 wherein said injector means further comprise flexible pressure transmitting means one side of which acts on said needle and wherein said means for controlling said pressure in said accumulation chamber and also the loading pressure of said needle are pneumatic means subjecting the other face of said flexible means to the action of air under a variable pressure.

8. An installation according to claim 7 wherein said flexible pressure transmitting means consists of a diaphragm.

9. An installation according to claim 7 wherein said flexible pressure transmitting means consists of a bellows.

References Cited

UNITED STATES PATENTS

| | | | |
|---|---|---|---|
| 2,355,177 | 8/1944 | Pescara | 123—46 |
| 2,449,382 | 9/1948 | Huber | 123—123.14 |
| 2,943,438 | 7/1960 | Huber | 60—13 |
| 2,960,818 | 11/1960 | Horgen | 60—13 |
| 3,159,149 | 12/1964 | King et al. | 123—46 |

WENDELL E. BURNS, *Primary Examiner.*